United States Patent [19]
Shoda et al.

[11] Patent Number: 6,114,451
[45] Date of Patent: Sep. 5, 2000

[54] RUBBER COMPOSITION

[75] Inventors: Takeshi Shoda; Naomi Okamoto, both of Ichihara; Koji Ohkawa, Kisarazu, all of Japan

[73] Assignees: Ube Industries, Ltd., Ube; Bridgestone Corporation, Tokyo, both of Japan

[21] Appl. No.: 09/136,457

[22] Filed: Aug. 19, 1998

[30] Foreign Application Priority Data

Aug. 21, 1997 [JP] Japan ..................... 9-224833

[51] Int. Cl.[7] ............... C08F 8/00; C08L 9/00; C08L 47/00
[52] U.S. Cl. .................. 525/191; 525/232; 525/236
[58] Field of Search ................... 525/191, 232, 525/236

[56] References Cited

U.S. PATENT DOCUMENTS

| | | | |
|---|---|---|---|
| 4,537,936 | 8/1985 | Takao et al. | 525/236 |
| 5,959,039 | 9/1999 | Yokoyama et al. | 525/236 |

FOREIGN PATENT DOCUMENTS

| | | |
|---|---|---|
| 0751181 A2 | 1/1997 | European Pat. Off. |
| 42-9017 | 5/1967 | Japan . |
| 62-179542 | 8/1987 | Japan . |
| 62-179548 | 8/1987 | Japan . |
| 4-100810 | 4/1992 | Japan . |
| 10-53671 | 2/1998 | Japan . |
| 10-60174 | 3/1998 | Japan . |
| WO98/07783 | 2/1998 | WIPO . |

*Primary Examiner*—Nathan M. Nutter
*Attorney, Agent, or Firm*—Armstrong, Westerman, Hattori, McLeland & Naughton

[57] ABSTRACT

In a rubber blend consisting of:
  a polybutadiene blend (A)+(B) composed of:
    (A) not less than 30% by weight but less than 70% by weight of a high molecular weight polybutadiene comprising as the main component a polybutadiene having an intrinsic viscosity $[\eta]$ of 3.0 to 7.0 as measured in toluene at 30° C. and a cis-1,4-configuration content of at least 80% and
    (B) more than 30% by weight but not more than 70% by weight of a low molecular weight polybutadiene comprising, as the main component, a polybutadiene having an intrinsic viscosity $[\eta]$ of 0.1 to 0.5 as measured in toluene at 30° C., and
  (C) a diene type rubber other than the above components (A) and (B),
the rubber blend (A)+(B) is contained in a proportion of 35 to 95 percent by total weight of rubber blend (A)+(B)+(C), thereby providing a rubber blend suitable for a tire; said blend being greatly improved in wet skid performance and ice skid performance with retention of the abrasion resistance of a conventional polybutadiene.

6 Claims, No Drawings

RUBBER COMPOSITION

BACKGROUND OF THE INVENTION

1. Field of the Invention

This invention relates to a rubber composition suitable for a rubber component for tire.

2. Prior Art

As a rubber composition for tire tread, there has been used a rubber composition comprising as the main component a styrene-butadiene copolymer having a relatively high glass transition temperature because, as for a tire of an automobile travelling on a general road, great importance is attached to braking performance on a wet road surface (wet skid performance) and controllability on a wet road surface. On the other hand, as for a tire for use in wintertime, great importance is attached to braking performance on ice and snow (ice skid performance), and hence, a polybutadiene rubber having a low glass transition temperature or natural rubber has been used.

With respect to the wet skid performance, it is important to increase the frictional force against road surface by increasing the hysteresis loss of tread rubber composition. That is to say, the tread surface which is being rubbed with road surface undergoes a high speed deformation by the fine irregularities of the road surface, and the larger the energy dissipation caused by the hysteresis loss produced during the periodic deformation course, the larger the frictional force. Since the deformation at the frictional interface takes place at a very high speed, it can be assumed based on the Williams-Landel-Ferry time-temperature superposition principle that the frictional force depends upon the hysteresis loss measured at a lower temperature than the tire-use temperature. Particularly, the friction coefficient of tire and tan δ (loss tangent), which is the measure of hysteresis loss, measured at around 0° C. show a good correlation.

On the other hand, as to the ice skid performance, it is important to increase the frictional coefficient against road surface by allowing a tread rubber composition to have a high flexibility at a low temperature (−20° C. or thereabout). At such low temperatures, the modulus of elasticity of a rubber composition increases, whereby it becomes difficult for the tread to follow the irregularities of road surface, and a frozen road surface is less uneven than a usual road surface. And hence, the deformation of tread surface decreases and the contribution of the energy dissipation (tan δ) produced at the interface between rubber and road surface to the ice skid performance becomes small. It is necessary to increase the real contact area between the tread surface and the road surface at low temperatures and it becomes more important to lower the storage modulus E' at about −20° C. (making the modulus of elasticity low).

There has been demanded a rubber composition for tire tread which has a further improved wet skid performance and ice skid performance, and, at the same time, has a performance capable of sufficiently satisfying the abrasion resistance.

JP-A-62-179,542 discloses a polybutadiene rubber composition suitable for the rubber component of a high-impact polystyrene resin, a composition which consists of 70 to 30% by weight of a high molecular weight polybutadiene comprising, as the main component, a polybutadiene having an intrinsic viscosity [η] of 3.0 to 7.0 and a cis-1,4-configuration, and 30 to 70% by weight of a low molecular weight polybutadiene comprising, as the main component, a polybutadiene having an intrinsic viscosity [η] of 0.5 to 1.4 and a cis-1,4-configuration. However, it has no statement of any application thereof to tire.

Moreover, JP-A-4-100,810 discloses a polybutadiene rubber composition suitable for the rubber component of a high-impact polystyrene resin, a composition which is composed of 80 to 30% by weight of a high molecular-weight polybutadiene, comprising as the main component, a polybutadiene having an intrinsic viscosity [η] of 3.0 to 7.0 and a cis-1,4-configuration content of at least 80%, and 20 to 70% by weight of a low molecular weight polybutadiene comprising, as the main component, a polybutadiene having an intrinsic viscosity [η] of 0.5 to 1.4 and a cis-1,4-configuration content of less than 80%. However, it has no statement of any application thereof to a tire.

Furthermore, JP-B-42-9,017 discloses a rubber composition consisting of 70 to 95% by weight of a high molecular weight polybutadiene having an intrinsic viscosity [η] of 1.5 to 20 and a cis-1,4-configuration content of at least 85%, and 30 to 5% by weight of a low molecular weight polybutadiene having an intrinsic viscosity [η] of 0.35 to 0.75.

SUMMARY OF THE INVENTION

According to this invention, there is provided a rubber blend consisting of a specific, high molecular weight polybutadiene, a specific, low molecular weight polybutadiene and a diene type rubber other than said polybutadienes, which can provide a rubber composition which is suitable for a tire, with good abrasion resistance similar to those with a conventional polybutadiene and with greatly improved wet skid performance and ice skid performance simultaneously.

An aspect of this invention is directed to a rubber blend consisting of:

a polybutadiene rubber blend (A)+(B) composed of:
- (A) not less than 30% by weight but less than 70% by weight of a high molecular weight polybutadiene comprising, as the main component, a polybutadiene having an intrinsic viscosity [η] of 3.0 to 7.0 as measured in toluene at 30° C. and a cis-1,4-configuration content of at least 80% and
- (B) more than 30% by weight but not more than 70% by weight of a low molecular weight polybutadiene comprising, as the main component, a polybutadiene having an intrinsic viscosity [η] of 0.1 to 0.5 as measured in toluene at 30° C., and
- (C) a diene type rubber other than the above components (A) and (B), wherein the polybutadiene rubber blend (A)+(B) is contained in a proportion of 35 to 95 percent by total weight of rubber blend (A)+(B)+(C).

Another aspect of this invention is directed to a rubber blend consisting of:

a polybutadiene blend (A)+(B) composed of:
- (A) not less than 30% by weight but less than 70% by weight of a high molecular weight polybutadiene comprising, as the main component, a polybutadiene having a weight average molecular weight (Mw) of 700,000 to 3,000,000 as measured by gel permeation chromatography (GPC) and a cis-1,4-configuration content of at least 80% and
- (B) more than 30% by weight but not more than 70% by weight of a low molecular weight polybutadiene comprising, as the main component, a polybutadiene having a weight average molecular weight (Mw) of 5,000 to 70,000 as measured by gel permeation chromatography (GPC), and (C) a diene type rubber other than the above components (A) and (B), wherein the polybutadiene rubber blend (A)+(B) is contained in a proportion of 35 to 95 percent by total weight of rubber blend (A)+(B)+(C).

A still another aspect of this invention is directed to a rubber blend consisting of:

a polybutadiene rubber blend (A)+(B) composed of:
- (A) not less than 30% by weight but less than 70% by weight of a high molecular weight polybutadiene comprising, as the main component, a polybutadiene having an intrinsic viscosity [η] of 3.0 to 7.0 as measured in toluene at 30° C. and
- (B) more than 30% by weight but not more than 70% by weight of a low molecular weight polybutadiene comprising, as the main component, a polybutadiene having an intrinsic viscosity [η] of 0.1 to 0.5 as measured in toluene at 30° C., and
- (C) a diene type rubber other than the components (A) and (B), wherein the polybutadiene rubber blend (A)+(B) is contained in a proportion of 35 to 95 percent by total weight of rubber blend (A)+(B)+(C), and the glass transition temperature (Tg ° C.) of the above diene type rubber component (C) in the rubber blend (A)+(B)+(C) satisfies the following relation to the glass transition temperature ($Tg_0$ ° C.) of the other diene type rubber (C) alone:

$$Tg_0 - 15 \leq Tg \leq Tg_0 - 1.5 (°\ C.).$$

A still further aspect of this invention is directed to a rubber blend consisting of:

a polybutadiene rubber blend composed of:
- (A) not less than 30% by weight but less than 70% by weight of a high molecular weight polybutadiene comprising, as the main component, a polybutadiene having an intrinsic viscosity [η] of 3.0 to 7.0 as measured in toluene at 30° C. and
- (B) more than 30% by weight but not more than 70% by weight of a low molecular weight polybutadiene comprising, as the main component, a polybutadiene having an intrinsic viscosity [η] of 0.1 to 0.5 as measured in toluene at 30° C., and
- (C) a diene type rubber other than the components (A) and (B), wherein the polybutadiene rubber blend (A)+(B) is contained in a proportion of 35 to 95% by total weight of rubber blend (A)+(B)+(C), and the phase structure of the above diene type rubber component (C) occludes in its interior the low molecular weight polybutadiene component (B) in a proportion of 5 to 1,000% by weight.

A still other aspect of this invention is directed to a rubber composition containing, as a rubber component, a rubber blend specified in any one of the aforementioned aspects and an effective amount of additions for rubber compositions.

DETAILED DESCRIPTION OF THE INVENTION

The rubber composition of this invention is explained in detail below.

The intrinsic viscosity [η] of the high molecular weight polybutadiene which is the component (A) of the polybutadiene rubber blend (A)+(B) is 3.0 to 7.0, preferably 3.5 to 6.0, as measured in toluene at 30° C.

The weight average molecular weight (Mw) of the component (A) of the polybutadiene rubber blend (A)+(B) is 700,000 to 3,000,000, preferably 1,100,000 to 2,000,000, as measured by gel permeation chromatography (GPC).

It is difficult to produce industrially a high molecular weight polybutadiene whose intrinsic viscosity [η] or weight average molecular weight is larger than the above-mentioned range thereof. When the intrinsic viscosity [η] or the weight average molecular weight (Mw) is smaller than the above-mentioned range thereof, the abrasion resistance cannot be maintained.

The cis-1,4-configuration content of the component (A) is at least 80%, preferably at least 85% and more preferably 85 to 98%.

When the cis-1,4-configuration content is smaller than the above range, the effect of improving the ice skid performance is not sufficient and the abrasion resistance cannot be maintained.

The intrinsic viscosity [η] of the low molecular weight polybutadiene which is the component (B) of the polybutadiene rubber blend (A)+(B) is 0.1 to 0.5, preferably 0.1 to 0.4, more preferably not less than 0.1 but less than 0.3 and particularly preferably 0.1 to 0.25, as measured in toluene at 30° C. The weight average molecular weight (Mw) of the component (B) of the polybutadiene rubber blend (A)+(B) is 5,000 to 70,000, preferably 5,000 to 60,000, more preferably not less than 5,000 but less than 30,000, particularly preferably 5,000 to 25,000, and most preferably 10,000 to 25,000, as measured by gel permeation chromatography (GPC).

When the intrinsic viscosity [η] or the weight average molecular weight (Mw) of the component (B) is larger than the above-mentioned range thereof, the improvement of wet skid performance and ice skid performance is not sufficient, and the abrasion resistance cannot be improved. It is difficult to produce industrially a polybutadiene rubber whose intrinsic viscosity [η] or weight average molecular weight (Mw) is smaller than the above-mentioned range thereof and hence said polybutadiene rubber is not desirable.

The mixing proportion of the high molecular weight polybutadiene component (A) and the low molecular weight polybutadiene component (B) in the polybutadiene rubber blend (A)+(B) is such that the proportion of the component (A) is not less than 30% by weight but less than 70% by weight, preferably not less than 40% by weight but less than 70% by weight of polybutadiene rubber blend (A)+(B), and the proportion of the component (B) is more than 30% by weight but not more than 70% by weight, preferably more than 30% by weight but not more than 60% by weight of the polybutadiene rubber blend (A)+(B). When the proportion of the component (A) is larger than the above-mentioned range, the processability is deteriorated and the effect of improving the wet skid performance and ice skid performance is small. When the proportion of the component (A) is smaller than the above-mentioned range, the viscosity of the polybutadiene rubber blend (A)+(B) becomes too low and hence said proportion is not desirable.

The polybutadiene rubber blend (A)+(B) can be produced by separately preparing the above high molecular weight polybutadiene component (A) and the above low molecular weight polybutadiene component (B) by polymerization and thereafter blending the two. The component (A) and the component (B) may be blended in solution or the two may be subjected to desolvation and then kneaded together to blend the two.

The high molecular weight polybutadiene (A) can be produced with a catalyst composed of a cobalt compound such as cobalt octenate-organoaluminum compound such as diethylaluminum monochloride-H₂O.

Moreover, the low molecular weight polybutadiene (B) can be produced with a catalyst composed of a nickel compound such as nickel naphthenate-organoaluminum compound such as diethylaluminum monochloride-H₂O, a lithium-containing catalyst or the like.

The polybutadiene rubber blend (A)+(B) may, if necessary, contain a polybutadiene whose intrinsic viscosity [η] or cis-1,4-configuration content is outside the above-mentioned range thereof, in a proportion of less than 50% by weight of the polybutadiene blend (A)+(B).

As the diene type rubber other than the components (A) and (B) which is the component (C) of the rubber composition of this invention, there can be used, for example, natural rubber, isoprene rubber, butadiene rubber, emulsion-polymerized or solution-polymerized styrene-butadiene rubber and the like.

In this invention, the polybutadiene rubber blend (A)+(B) is contained in a proportion of 35 to 95 percent by weight, preferably 40 to 80 percent by weight, of the total rubber blend (A)+(B)+(C).

In order to balance the wet skid performance with the ice skid performance while keeping the two at the desired level, it is preferable that the glass transition temperature (Tg °C.) of said other diene type rubber component (C) in the rubber blend satisfies the following relation to the glass transition temperature ($Tg_0$ °C.) of the above other diene type rubber alone:

$$Tg_0-15 \leq Tg \leq Tg_0-1.5 (° C.),$$

and it is more preferable that the Tg satisfies the following relation to the $Tg_0$:

$$Tg_0-10 \leq Tg \leq Tg_0-3 (° C.).$$

Furthermore, the components (B) and (C) are blended in proportions so adjusted that the low molecular weight polybutadiene component (B) is contained in the structure portion of the above other diene type rubber component (C) in a proportion of 5 to 1,000% by weight, preferably 5 to 200% by weight and particularly preferably 5 to 25% by weight of component (C). By this blending, the wet skid performance can be improved while the deterioration of the ice skid performance is prevented.

By blending the above components (A), (B) and (C) within the above-mentioned range of proportions, it is made possible for the component (C) to contain the component (B) though the reason thereof is not clear. Thus, the wet skid performance and ice skid performance are improved. Of course, when the proportions are outside the above-mentioned ranges, it would not be possible that the component (C) occludes the component (B) in the desired proportion and a sufficient improvement in wet skid performance and ice skid performance would not be expected.

Each of the components of the rubber blend of this invention can be mixed during kneading by a Banbury mixer, a roll mill or the like which is conventionally conducted, or it is possible to previously mix the components in solution as produced by polymerization, dry the resulting mixture, and use the thus dried mixture.

The rubber composition of this invention may be obtained by blending the rubber blend of this invention, with appropriate chemicals which are usually used in the rubber field, such as a vulcanizing agent, a vulcanization accelerator, an antioxidant, a filler, a process oil, zinc oxide, stearic acid or the like.

The vulcanizing agent includes known vulcanizing agents, for example, sulfur, sulfur donors, organic peroxides, resin vulcanizing agents, metal oxides such as magnesium oxide, and the like.

The vulcanization accelerator includes known vulcanization accelerators such as aldehydes, ammonias, amines, guanidines, thioureas, thiazoles, thiurams, dithiocarbamates, xanthates and the like.

The filler includes reinforcing agents such as various carbon blacks, white carbon, activated calcium carbonate, ultrafine magnesium silicate, high styrene resins, phenols resins, lignin, modified melamine resins, coumarone-indene resins, petroleum resins and the like; calcium carbonate; basic magnesium carbonate; clay; litharge; diatomaceous earth; recycled rubbers; powdered rubbers; and the like.

The antioxidant includes amine-ketone type, imidazole type, amine type, phenol type, sulfur type, phosphorus type and the like.

As the process oil, there may be used any of aromatic type, naphthene type and paraffin type.

A vulcanized rubber composition obtained by vulcanizing the rubber composition of this invention can be applied to tire uses such as studless tire, snow tire, all-season tire and the like and oversized tire uses, making the best use of the improved wet skid performance, ice skid performance and abrasion resistance. In addition, the vulcanized rubber composition can be employed in such uses as automobile parts, damping rubber, industrial parts and the like.

DESCRIPTION OF THE PREFERRED EMBODIMENTS

This invention is explained in detail below based on Examples; however, this invention should not be construed to be limited to the Examples.

The measurement of physical properties of the vulcanized rubber compositions was conducted by the following methods:

[1] Viscoelastic properties (0° C. tan δ)

Determined using a viscoelasticity measuring apparatus (manufactured by Rheometrics) under the conditions of a temperature of 0° C., a dynamic strain of ±2% and a frequency of 10 Hz. The results obtained are shown as an index obtained by assuming the data in Comparative Example 1 as 100. The larger the numerical value, the better the wet skid performance.

[2] Viscoelastic properties (−20° C. E')

Determined using a viscoelasticity measuring apparatus (manufactured by Rheometrics) under the conditions of a temperature of −20° C., a dynamic strain of ±2% and a frequency of 10 Hz. The results obtained are shown as an index obtained by assuming the data in Comparative Example 1 as 100. The smaller the numerical value, the better the ice skid performance.

[3] Abrasion resistance

Determined using a Lambourn abrasion tester (manufactured by Iwamoto Seisakusho K. K.) under the conditions of a temperature of 30° C. and a slip ratio of 20%. The results obtained are shown as an index obtained by assuming the data in Comparative Example 1 as 100. The larger the numerical value, the better the abrasion resistance.

[4] Lowering of glass transition temperature of other diene type rubber component (C) ($Tg-Tg_0$)

The peak temperature of tan δ showing the Tg of the diene type rubber component (C) other than the components (A) and (B) was measured by using a viscoelasticity measuring apparatus (manufactured by Rheometrics) under the conditions of a dynamic strain of ±0.05% and a frequency of 10 Hz, and the lowering of the glass transition temperature of other diene type rubber component (C) (ΔT) was calculated from the following relational equation:

ΔT=(Tg of the diene type rubber component (C) in each rubber composition (A)+(B)+(C))—(Tg$_0$ of Comparative Example 8).

[5] Proportion of low molecular weight polybutadiene (B) contained in the structure portion of the diene type rubber component (C) other than the components (A) and (B)

Using a viscoelasticity spectrometer (manufactured by Rheometrics), the tan δ value at the peak of a natural rubber (hereinafter referred to as NR), when the blending proportions of polybutadiene rubber "UBEPOL-BR150L" manufactured by Ube Industries, Ltd. (hereinafter referred to as BR2) and NR (the diene type rubber component (C)) in Comparative Example 1 were changed to BR2/NR=90/10–10/90, was measured under the conditions of a dynamic strain of ±0.05% and a frequency of 10 Hz, and the blending proportion and the tan δ peak value as to NR were previously related to each other by the following relational equation (2):

tanδpeak value of NR=0.009+0.0105×(blending proportion of NR in the rubber blend).

In this case, utilizing the fact that the tan δ peak value of NR shown when the low molecular weight polybutadiene component (B) is occluded in the phase structure of NR becomes the tan δ peak value corresponding to the value when the amount of NR is equal to a total of the proportions of NR charged and the low molecular weight polybutadiene component (B) occluded in the phase structure portion of NR, the proportion of the low molecular weight polybutadiene component (B) occluded in the phase structure of the diene type rubber component (C) was calculated by the following method:

1) The tan δ peak value of NR (the diene type rubber component (C) other than the components (A) and (B)) is substituted for the corresponding portion of the equation (2) to calculate the calculated blending proportion of NR.

2) The proportion of the low molecular weight polybutadiene component (B) occluded in the phase structure of NR is calculated by the following formula: [(the calculated blending proportion of NR)—(the proportion of NR charged)]/(the proportion of NR charged).

Process for producing polybutadiene rubber blend (1) Production of the component (A) (high molecular weight polybutadiene)

As to Samples 1 to 3, under the polymerization conditions shown in Table 1, benzene (BZ) and 1,3-butadiene (BD) were charged into a 1.5-liter (L) autoclave equipped with a stirrer, which had been purged with nitrogen; the resulting mixture was stirred; water was added thereto to form a solution; cyclooctadiene (COD) and diethylaluminum monochloride (DEAC) were added to the solution; the temperature was elevated to 60° C.; cobalt octenate (Co·oct) was added; the resulting mixture was subjected to polymerization at 60° C. for 30 minutes; after completion of the polymerization, 5 mL of methanol containing a small amount of 2,6-di-tertiary butylparacresol was poured into the resulting polymerization mixture to terminate the polymerization; and after depressurization, the resulting polymerization mixture was taken out and vacuum-dried to obtain a polybutadiene. The analysis results of the polybutadiene obtained are shown in Table 2.

As to Sample 4, under the polymerization conditions shown in Table 1, benzene and 1,3-butadiene were charged into a 2.0-L autoclave equipped with a stirrer, which had been purged with nitrogen and stirred; n-butyllithium (n-BuLi) was added thereto, and the resulting mixture was subjected to polymerization for 60 minutes; during that period the temperature was elevated gradually to 70° C., and was kept at this level up to the end of polymerization; after completion of the polymerization, 5 mL of methanol containing a small amount of 2,6-di-tertiary butylparacresol was poured into the resulting polymerization mixture to terminate the polymerization; and after depressurization, the polymerization mixture was taken out and vacuum-dried to obtain a polybutadiene. The analysis results of the polybutadiene obtained are shown in Table 2.

(2) Production of the component (B) (low molecular weight polybutadiene)

As to Samples 5 to 8, under the polymerization conditions shown in Table 3, benzene and 1,3-butadiene were charged into a 1.5-L autoclave equipped with a stirrer, which had been purged with nitrogen; the resulting mixture was stirred; water was added thereto to form a solution; diethylaluminum monochloride was added to the solution; the temperature was elevated to 80° C.; nickel octenate (Ni·oct) was added thereto; the resulting mixture was subjected to polymerization at 80° C. for 30 minutes; after completion of the polymerization, 5 mL of methanol containing a small amount of di-tertiary butylparacresol was poured into the resulting polymerization mixture to terminate the polymerization; and after depressurization, the polymerization mixture was taken out and vacuum-dried to obtain a polybutadiene. The analysis results of the polybutadiene obtained are shown in Table 4.

As to Samples 9 and 10, under the polymerization conditions shown in Table 3, benzene and 1,3-butadiene were charged into a 2.0-L autoclave equipped with a stirrer, which had been purged with nitrogen; the resulting mixture was stirred; n-butyllithium was added thereto, and the resulting mixture was subjected to polymerization for 60 minutes; during that period the temperature was elevated gradually to 70° C., and was kept at this level up to the end of polymerization; after completion of the polymerization, 5 mL of methanol containing a small amount of di-tertiary butylparacresol was poured into the resulting polymerization mixture to terminate the polymerization; and after depressurization, the polymerization mixture was taken out and vacuum-dried, to obtain a polybutadiene. The analysis results of the polybutadiene obtained are shown in Table 4.

(3) Production of polybutadiene rubber blend

One of the samples of the polybutadiene component (A) produced in (1) described above and one of the samples of the polybutadiene component (B) obtained in (2) described above were blended in hexane in the proportions shown in Table 5. The resulting blend was subjected to removal of solvent and drying to obtain a poly-butadiene rubber blend.

The cis-content shown in Tables 2 and 4 was obtained by an infrared absorption spectrum analysis. A microstructure was calculated from the absorption intensity ratio of cis (740 cm$^{-1}$), trans (967 cm$^{-1}$) and vinyl (910 cm$^{-1}$). The intrinsic viscosity [η] was measured in toluene at 30° C. Mw and Mw/Mn were determined from the polystyrene-reduced weight average molecular weight (Mw) and polystyrene-reduced number average molecular weight (Mn) measured by gel permeation chromatography (GPC).

TABLE 1

| | Polymerization conditions of component (A) | | | | | |
|---|---|---|---|---|---|---|
| Sample No. | BZ mL | BD g | Water mmol | COD mmol | DEAC mmol | Co.-oct mmol | n-BuLi mmol |
| 1 | 740 | 161 | 1.66 | 0.67 | 4.15 | 0.01 | — |
| 2 | 740 | 161 | 1.60 | 0.65 | 4.15 | 0.01 | — |
| 3 | 740 | 161 | 1.60 | 2.75 | 4.15 | 0.01 | — |
| 4 | 893 | 337 | — | — | — | — | 1.5 |

TABLE 2

Molecular weight, chemical structure and intrinsic viscosity of component (A)

| Sample No. | [η] | Mw | Mw/Mn | Cis content (wt. %) |
|---|---|---|---|---|
| 1 | 4.0 | 1,240,000 | 2.2 | 97.9 |
| 2 | 4.3 | 1,350,000 | 2.2 | 97.9 |
| 3 | 2.6 | 850,000 | 2.2 | 97.8 |
| 4 | 4.6 | 1,170,000 | 1.5 | 56.6 |

TABLE 3

Polymerization conditions of component (B)

| Sample No. | BZ mL | BD g | Water mmol | DEAC mmol | Ni.oct mmol | n-BuLi mmol |
|---|---|---|---|---|---|---|
| 5 | 800 | 124 | 1.66 | 4.15 | 0.02 | — |
| 6 | 740 | 161 | 1.38 | 4.15 | 0.02 | — |
| 7 | 753 | 166 | 1.60 | 4.00 | 0.05 | — |
| 8 | 753 | 166 | 2.00 | 4.00 | 0.05 | — |
| 9 | 893 | 337 | — | — | — | 35 |
| 10 | 893 | 337 | — | — | — | 13 |

TABLE 4

Molecular weight, chemical structure and intrinsic viscosity of component (B)

| Sample No. | [β] | Mw | Mw/Mn | Cis content (wt. %) |
|---|---|---|---|---|
| 5 | 0.2 | 20,000 | 2.2 | 91.0 |
| 6 | 0.3 | 40,000 | 2.3 | 91.0 |
| 7 | 0.6 | 100,000 | 2.4 | 93.5 |
| 8 | 0.9 | 190,000 | 3.1 | 95.4 |
| 9 | 0.2 | 20,000 | 1.1 | 40.4 |
| 10 | 0.3 | 30,000 | 1.2 | 39.9 |

TABLE 5

| Polybutadiene rubber composition | Component (A) (high molecular weight) | Component (B) (low molecular weight) | (A)/(B) (wt. %) |
|---|---|---|---|
| A | Sample 1 | Sample 5 | 50/50 |
| B | Sample 2 | Sample 5 | 50/50 |
| C | Sample 2 | Sample 5 | 80/20 |
| D | Sample 2 | Sample 5 | 68/32 |
| E | Sample 2 | Sample 5 | 30/70 |
| F | Sample 2 | Sample 6 | 50/50 |
| G | Sample 2 | Sample 7 | 50/50 |
| H | Sample 2 | Sample 8 | 50/50 |
| I | Sample 2 | Sample 9 | 50/50 |
| J | Sample 2 | Sample 10 | 50/50 |
| K | Sample 3 | Sample 5 | 50/50 |
| L | Sample 4 | Sample 5 | 50/50 |

Examples 1 to 8 and Comparative Examples 1 to 8

One of the polybutadiene rubber compositions shown in Table 5 was kneaded with other ingredients according to the formulation shown in Tables 6 to 9 and the resulting rubber composition was subjected to molding and vulcanization in a conventional manner to obtain a test specimen, after which the viscoelastic properties and abrasion resistance of the specimens were evaluated to obtain the results shown in Tables 6 to 9.

In the compounding formulations in Tables 6 to 9, the unit of amount is part by weight. As the formulation ingredients in these Tables, the following were used:

(a) BR1: The polybutadiene rubber blend shown in Table 5.

(b) BR2: Polybutadiene rubber "UBEPOL-BR150L" manufactured by Ube Industries, Ltd.

(c) NR: Natural rubber RSS No. 3

TABLE 6

| | Example 1 | Example 2 | Example 3 | Example 4 | Example 5 |
|---|---|---|---|---|---|
| OBR1 | | | | | |
| Kind | A | B | F | B | D |
| Amount | 60 | 60 | 60 | 90 | 60 |
| BR2 | — | — | — | — | — |
| NR | 40 | 40 | 40 | 10 | 40 |
| Carbon black | 45 | 45 | 45 | 45 | 45 |
| Aromatic oil | 10 | 10 | 10 | 10 | 10 |
| Zinc oxide | 3 | 3 | 3 | 3 | 3 |
| Stearic acid | 2 | 2 | 2 | 2 | 2 |
| Antioxidant | 1 | 1 | 1 | i | 1 |
| Sulfur | 1 | i | 1 | 1 | 1 |
| Vulcanization accelerator | 0.8 | 0.8 | 0.8 | 0.8 | 0.8 |
| Viscoelastic properties (index) | | | | | |
| 0° C. tan δ | 134 | 132 | 127 | 150 | 108 |
| −20° C. E' | 57 | 58 | 62 | 51 | 71 |
| Abrasion resistance (index) | 116 | 112 | 97 | 120 | 105 |
| Lowering of glass transition temp. of the diene type rubber component(C) (Tg−Tg$_0$) | 6° C. | 6° C. | 4° C. | 12° C. | 5° C. |
| Proportion of low molecular weight polybutadiene (B) contained in phase structure of the diene type rubber component (C) | 26 wt % | 27 wt % | 20 wt % | 162 wt % | 17 wt % |

TABLE 7

| | Example 6 | Example 7 | Example 8 |
|---|---|---|---|
| BR1 | | | |
| Kind | E | I | J |
| Amount | 60 | 60 | 60 |
| BR2 | — | — | — |
| NR | 40 | 40 | 40 |
| Carbon black | 45 | 45 | 45 |
| Aromatic oil | 10 | 10 | 10 |
| Zinc oxide | 3 | 3 | 3 |
| Stearic acid | 2 | 2 | 2 |
| Antioxidant | 1 | 1 | 1 |
| Sulfur | 1 | 1 | 1 |

TABLE 7-continued

|  | Example 6 | Example 7 | Example 8 |
|---|---|---|---|
| Vulcanization accelerator | 0.8 | 0.8 | 0.8 |
| Viscoelastic properties (index) | | | |
| 0° C. tan δ | 143 | 148 | 141 |
| −20° C. E' | 51 | 62 | 65 |
| Abrasion resistance (index) | 120 | 128 | 100 |
| Lowering of glass transition temp. of the diene type rubber component (C) (Tg−Tg₀) | 8° C. | 7° C. | 6° C. |
| Proportion of low molecular weight polybutadiene (B) contained in phase structure of the diene type rubber component (C) | 38 wt % | 53 wt % | 50 wt % |

TABLE 8

|  | Comp. Example 1 | Comp. Example 2 | Comp. Example 3 | Comp. Example 4 | Comp. Example 5 |
|---|---|---|---|---|---|
| BR1 | | | | | |
| Kind | — | K | L | G | H |
| Amount | — | 60 | 60 | 60 | 60 |
| BR2 | 60 | — | — | — | — |
| NR | 40 | 40 | 40 | 40 | 40 |
| Carbon black | 45 | 45 | 45 | 45 | 45 |
| Aromatic oil | 10 | 10 | 10 | 10 | 10 |
| Zinc oxide | 3 | 3 | 3 | 3 | 3 |
| Stearic acid | 2 | 2 | 2 | 2 | 2 |
| Antioxidant | 1 | 1 | 1 | 1 | 1 |
| Sulfur | 1 | 1 | 1 | 1 | 1 |
| Vulcanization accelerator | 0.8 | 0.8 | 0.8 | 0.8 | 0.8 |
| Viscoelastic properties (index) | | | | | |
| 0° C. tan δ | 100 | 142 | 131 | 110 | 105 |
| −20° C. E' | 100 | 50 | 45 | 70 | 78 |
| Abrasion resistance (index) | 100 | 81 | 80 | 80 | 82 |
| Lowering of glass transition temp. of the diene type rubber component (C) (Tg−Tg₀) | 0° C. | 5° C. | 5° C. | 0° C. | 0° C. |
| Proportion of low molecular weight polybutadiene (B) contained in phase structure of the diene type rubber component (C) | 0 wt % | 20 wt % | 23 wt % | 0 wt % | 0 wt % |

TABLE 9

|  | Comp. Example 6 | Comp. Example 7 | Comp. Example 8 |
|---|---|---|---|
| BR1 | | | |
| Kind | C | B | — |
| Amount | 60 | 10 | — |
| BR2 | — | — | — |
| NR | 40 | 90 | 100 |
| Carbon black | 45 | 45 | 45 |
| Aromatic oil | 10 | 10 | 10 |
| Zinc oxide | 3 | 3 | 3 |
| Stearic acid | 2 | 2 | 2 |
| Antioxidant | 1 | 1 | 1 |
| Sulfur | 1 | 1 | 1 |
| Vulcanization accelerator | 0.8 | 0.8 | 0.8 |
| Viscoelastic properties | | | |
| 0° C. tan δ | 90 | 106 | 110 |
| −20° C. E' | 105 | 110 | 130 |
| Abrasion resistance (index) | 98 | 90 | 80 |
| Lowering of glass transition temp. of the diene type rubber component (C) (Tg−Tg₀) | 4° C. | 0° C. | 0° C. |
| Proportion of low molecular weight polybutadiene (B) contained in phase structure of the diene type rubber component (C) | 7 wt % | 2 wt % | 0 wt % |

As shown in Tables 6 to 9, using Comparative Example 1 in which a typical existing polybutadiene rubber excellent in abrasion resistance was employed as a standard, and the Examples 1 to 8 and Comparative Examples 2 to 8 were evaluated. Examples 1 to 8 are of this invention and as shown in Tables 6 and 7, the abrasion resistance is equivalent to or greatly improved as compared with that of Comparative Example 1, and the wet skid performance and ice skid performance are also improved as compared with those of Comparative Example 1. By comparing Example 2 with Example 3, it is understood that when the [η] of the low molecular weight polybutadiene [the component (B)] is lowered from 0.3 to 0.2, each of the abrasion resistance, wet skid performance and ice skid performance is greatly improved. From the comparison of Example 7 with Example 8, the same tendency is seen.

In Comparative Examples 2 and 3, it is seen that since the lowering of glass transition temperature of other diene type rubber component (C) represented by $Tg-Tg_0$ is found, an improvement in wet skid performance and ice skid performance is observed, but the abrasion resistance does not reach the required level because the cis-1,4-configuration content or the intrinsic viscosity is outside the scope defined in this invention.

As explained above, according to this invention, there can be provided a rubber composition which is excellent in abrasion resistance, wet skid performance and ice skid performance and suitable for tire, a composition; said composition being composed of a specific, high molecular weight polybutadiene, a specific, low molecular weight polybutadiene and other diene type rubber.

What is claimed is:

1. A rubber blend consisting of:
    a polybutadiene rubber blend (A)+(B) composed of:
    (A) not less than 30% by weight but less than 70% by weight of a high molecular weight polybutadiene comprising, as the main component, a polybutadiene having in intrinsic viscosity [η] of 3.0 to 7.0 as measured in toluene at 30° C. and a cis-1,4-configuration content of at least 80% and
    (B) more than 30% by weight but not more than 70% by weight of a low molecular weight polybutadiene comprising, as the main component, a polybutadiene having an intrinsic viscosity [η] of 0.1 to 0.5 as measured in toluene at 30° C., and
    (C) a diene type rubber other than the above components (A) and (B),
    wherein the polybutadiene rubber blend (A)+(B) is contained in a proportion of 35 to 95 percent by total weight of rubber blend (A)+(B)+(C) rubber composition.

2. A rubber blend consisting of:
    a polybutadiene rubber blend (A)+(B) composed of:
    (A) not less than 30% by weight but less than 70% by weight of a high molecular weight polybutadiene having a weight average molecular weight (Mw) of 700,000 to 3,000,000 as measured by gel permeation chromatography (GPC), and a cis-1,4-configuration content of at least 80% and
    (B) more than 30% by weight but not more than 70% by weight of a low molecular weight polybutadiene comprising, as the main component, a polybutadiene having a weight average molecular weight (Mw) of 5,000 to 70,000 as measured by gel permeation chromatography, and
    (C) a diene type rubber other than the components (A) and (B),
    wherein the polybutadiene rubber blend (A)+(B) is contained in a proportion of 35 to 95 percent by total weight of rubber blend (A)+(B)+(C).

3. A rubber blend consisting of:
    a polybutadiene rubber blend (A)+(B) composed of:
    (A) not less than 30% by weight but less than 70% by weight of a high molecular weight polybutadiene comprising, as the main component, a polybutadiene having an intrinsic viscosity [η] of 3.0 to 7.0 as measured in toluene at 30° C. and
    (B) more than 30% by weight but not more than 70% by weight of a low molecular weight polybutadiene comprising, as the main component, a polybutadiene having an intrinsic viscosity [η] of 0.1 to 0.5 as measured in toluene at 30° C., and
    (C) a diene type rubber other than the components (A) and (B),
    wherein the polybutadiene rubber blend (A)+(B) is contained in a proportion of 35 to 95 percent by total weight of rubber blend (A)+(B)+(C) and the glass transition temperature (Tg ° C.) of said diene type rubber component (C) in the rubber blend (A)+(B)+(C) satisfies the following relation to the glass transition temperature ($Tg_0$ ° C.) of said diene type rubber component (C) alone:

$Tg_0-15 \leq Tg \leq Tg_0-1.5$ (° C.).

4. A rubber composition which comprises a rubber blend consisting of:
    a polybutadiene rubber blend (A)+(B) composed of:
    (A) not less than 30% by weight but less than 70% by weight of a high molecular weight polybutadiene comprising, as the main component, a polybutadiene having an intrinsic viscosity [η] of 3.0 to 7.0 as measured in toluene at 30° C. and a cis-1,4-configuration content of at least 80% and
    (B) more than 30% by weight but not more than 70% by weight of a low molecular weight polybutadiene comprising, as the main component, a polybutadiene having an intrinsic viscosity [η] of 0.1 to 0.5 as measured in toluene at 30° C., and
    (C) a diene type rubber other than the above components (A) and (B),
    wherein the polybutadiene rubber blend (A)+(B) is contained in a proportion of 35 to 95 percent by total weight of rubber blend (A)+(B)+(C), and an effective amount of additives for a rubber composition.

5. A rubber composition which comprises a rubber blend consisting of:
    a polybutadiene rubber blend (A)+(B) composed of:
    (A) not less than 30% by weight but less than 70% by weight of a high molecular weight polybutadiene having a weight average molecular weight (Mw) of 700,000 to 3,000,000 as measured by a gel permeation chromatography (GPC), and a cis-1,4-configuration content of at least 80% and
    (B) more than 30% by weight but not more than 70% by weight of a low molecular weight polybutadiene comprising, as the main component, a polybutadiene having a weight average molecular weight (Mw) of 5,000 to 70,000 as measured by gel permeation chromatography, and (C) a diene type rubber other than the components (A) and (B),
    wherein the polybutadiene rubber blend (A)+(B) is contained in a proportion of 35 to 95 percent by total weight of rubber blend (A)+(B)+(C), and an effective amount of additives for a rubber composition.

6. A rubber composition which comprises a rubber blend consisting of:
    a polybutadiene rubber blend (A)+(B) composed of:
    (A) not less than 30% by weight but less than 70% by weight of a high molecular weight polybutadiene comprising, as the main component, a polybutadiene having an intrinsic viscosity [72 ] of 3.0 to 7.0 as measured in toluene at 30° C. and
    (B) more than 30% by weight but not more than 70% by weight of a low molecular weight polybutadiene comprising, as the main component, a polybutadiene having an intrinsic viscosity [η] of 0.1 to 0.5 as measured in toluene at 30° C., and (C) a diene type rubber other than the components (A) and (B)

wherein the polybutadiene rubber blend (A)+(B) is contained in a proportion of 35 to 95 percent by total weight of rubber blend (A)+(B)+(C) and the glass transition temperature (Tg ° C.) of said diene type rubber component (C) satisfies the following relation to the glass transition temperature ($Tg_0$ ° C.) of said diene type rubber component (C) alone:

$$Tg_0-15 \leq Tg \leq Tg_0-1.5 (° C.);$$

and an effective amount of additives for a rubber composition.

* * * * *